INVENTOR.
DONALD G. RENNO

June 25, 1957    D. G. RENNO    2,797,130
VEHICLE BODY DOOR STRUCTURE
Original Filed Jan. 4, 1954    2 Sheets-Sheet 2
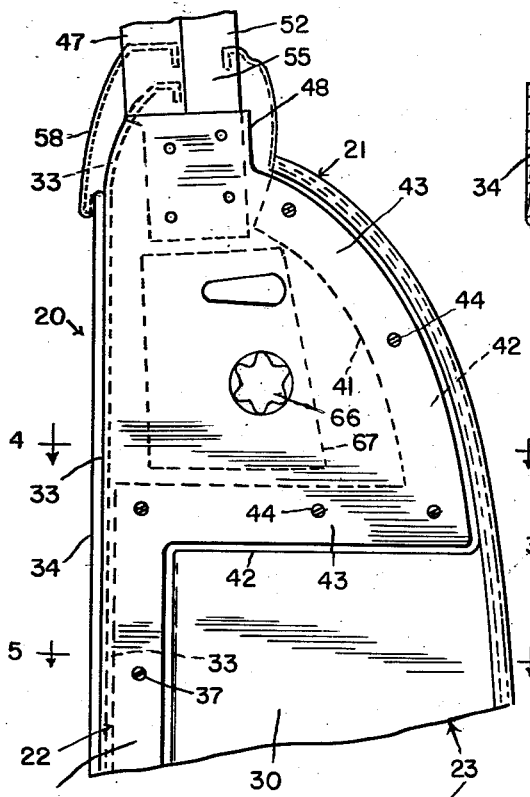
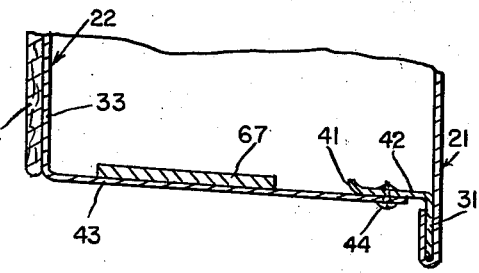
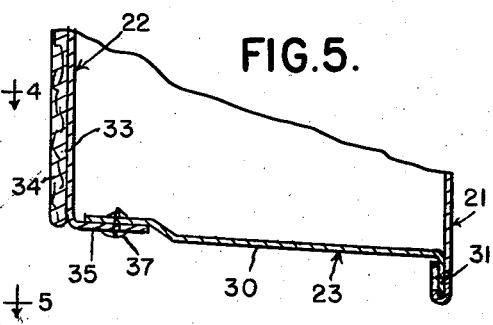
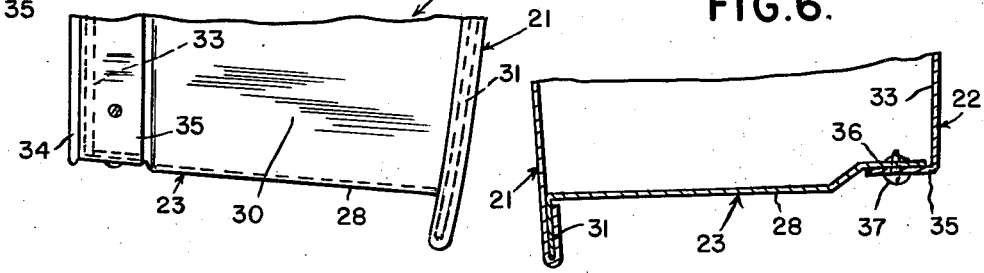
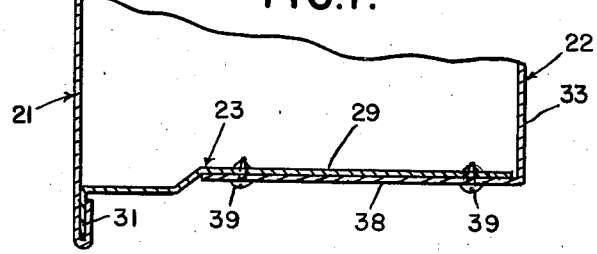
*INVENTOR.*
DONALD G. RENNO
BY
    *ATTORNEYS*

United States Patent Office 2,797,130
Patented June 25, 1957

2,797,130

VEHICLE BODY DOOR STRUCTURE

Donald G. Renno, Birmingham, Mich., assignor to Motor Products Corporation, Detroit, Mich., a corporation of New York Original application January 4, 1954, Serial No. 401,948. Divided and this application March 21, 1955, Serial No. 495,658

8 Claims. (Cl. 296—44)

The present invention relates generally to vehicle bodies and refers more particularly to improvements in vehicle body door structures. This application is a division of my copending application Serial No. 401,948, filed January 4, 1954.

Vehicle body doors usually comprise an outer panel, an inner panel spaced laterally from the outer panel to provide a window receiving well, a window frame secured to the outer panel, a window assembly in the frame having a panel slidable into and out of the well, a ventilator panel mounted in the frame for swinging movement about a substantially vertically extending axis, regulator mechanism supported within the well to one side of the path of travel of the vertically slidable window panel and connected to the latter for operating the same, operating mechanism for the ventilator panel, a latch assembly for the door, and a remote control for the latch assembly. The above are a few of the essential parts of the door structure which render the latter difficult and expensive to manufacture.

It is an object of this invention to simplify the assembly of vehicle body doors of the general type noted above by providing the door structure with a removable inner panel and by mounting the window frame on the removable panel in a manner such that the frame may be installed as a unit with the inner panel.

It is another object of this invention to further simplify the assembly of the door structure by mounting the window assembly, regulator mechanism for the vertically slidable window panel, latch mechanism, and remote control for the latch mechanism on the removable inner panel so that all of the foregoing may also be installed as a unit with the inner panel.

It is a more particular object of the invention to provide a door structure of the aforesaid type in which the removable inner panel which carries the window assembly, the regulator and latch mechanisms and the remote control is of one piece construction throughout. It is in the form of a single sheet metal stamping coextensive in height with the outer door panel in the area beneath the door window.

The inner panel can thus be produced as a relatively simply fabricated, shallow draw stamping and assembled inexpensively to the outer panel by an interposed, equally simply formed end and bottom rail member. A window frame is of course assembled as a part of the removable inner panel.

In view of an increasing automotive design trend toward door outlines of elaborate sectional contour, involving sharp radii of bend, it is evident that a maximum simplification of the principle of the invention would be achieved by constructing the door of only two sections, i. e., an outer panel and an inner panel unit, as described above, embracing the window panel and carrying the various door control and operating instrumentalities. However, excessive time, labor and tool costs arise from the use of cam dies and related equipment in making necessary deep drawn end and bottom formations of such an inner panel. Hence it is a practical object of the invention to avoid these costs by fabricating the door structure of three essential parts, namely, an outer panel, an inner panel and window frame unit of full door height and width, and a rail unit continuously joining the outer and inner panels about their end and bottom margins. These parts are quickly and cheaply assembled to complete the door.

The foregoing as well as other objects will be made more apparent as this description proceeds especially when considered in connection with the accompanying drawings, wherein Figure 1 is a perspective view of the vehicle body door structure showing the inner side of the door;

Figure 3 is a fragmentary end elevational view of the rear edge of the door;

Figure 4 is a cross sectional view taken on the line 4—4 of Figure 3;

Figure 5 is a cross sectional view taken on the line 5—5 of Figures 3;

Figures 1, 2:
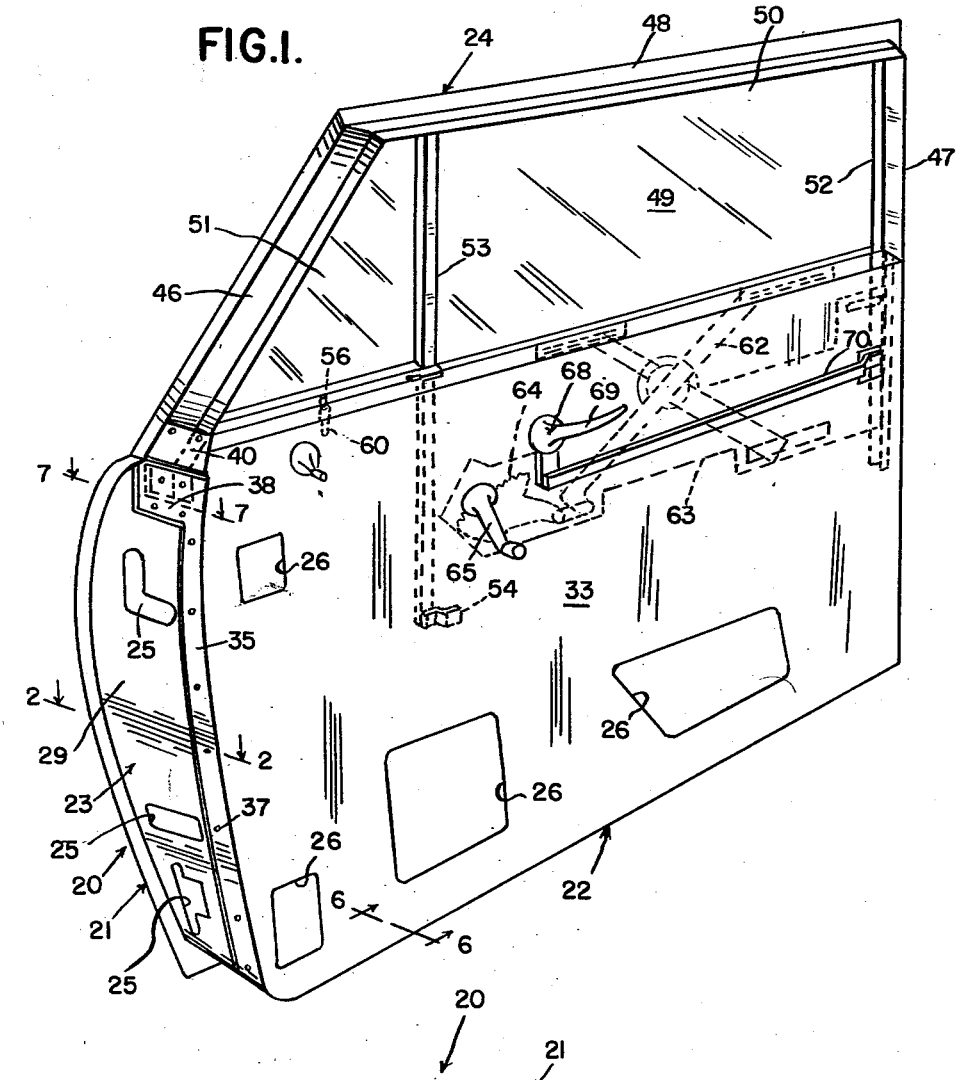
Figure 2 is a sectional view taken on the line 2—2 of Figure 1.

Figures 6 and 7 are respectively sectional views taken on the lines 6—6 and 7—7 of Figure 1.

Referring first to Figure 1, the vehicle body door structure is indicated generally by the numeral 20 and is of the type adapted to be hingedly mounted at its front edge, although it will be apparent from the following description that the present invention is equally applicable to vehicle body door structures regardless of whether the latter are hingedly supported at the front or rear edges. The door structure 20 is a rail type and comprises an outer panel 21, inner panel unit 22, a rail 23 interposed between the same, and a window frame 24 at the top of the panels. The door panels may be formed of sheet metal, plastics or any sheet material possessing the requisite strength and forming characteristics.

The rail 23 at the front end of the door is formed with clearance openings 25 for accommodating the usual hinges and door check which are not shown herein. Also, the inner panel unit 22 has clearance openings 26 therethrough which are arranged to facilitate assembly of the various parts of the door structure.

The rail 23 comprises a bottom section 28 (Figure 6), a front section 29 (Figure 2) and a rear section 30 (Figure 5). These sections are continuous and are turned laterally outwardly at the outer edge to provide a terminal flange 31. The adjacent marginal portions of the outer panel 21 are crimped over the terminal flanges 31 and may be welded to the latter to provide an integral structure.

The inner panel unit 22 is of one-piece construction, including full width, full depth inner panel 33 in which clearance openings 26 are formed. Panel 33 provides a backing for the usual trim panel 34, which covers substantially its entire surface, and the bottom and end edges thereof are turned outwardly to form marginal flanges 35. The flanges 35 overlie the adjacent portions 36 of the rail 23, and these portions are offset laterally inwardly to provide a recess for receiving the flanges 35. In the present instance the flanges 35 are removably secured to the offset portions 36 of the rail 23 by detachable fastener elements 37.

As shown in Figure 1 of the drawings, the outturned tab or extension 38 of inner panel 33, at the front edge of the door, itself has an inwardly angled top extremity 40.

As shown in Figure 7 of the drawings, the front section 29 of the rail 23 is offset laterally inwardly for substantially its full width and the inner panel 33 is fashioned with an extension or tab 38 which projects outwardly in overlying relationship to the extended offset portion of the rail section 29. The tab 38 is removably secured to the rail 23 by detachable fasteners 39.

As shown in Figures 3 and 4 of the drawings, the upper end of the rear rail section 30 is notched or cut away as at 41 providing a marginal flange 42. The inner panel 33 has an extension or tab 43 which projects outwardly in overlying relationship to the cut away portion 41 and is removably secured to the flange 42 by detachable fasteners 44.

The window frame 24 at the top of the door structure 20 is secured to the inner door panel unit 22 in a manner to enable installing the same as a single unit. The window frame 24 is shown herein as formed of rolled sections having conventional cross sectional contours, although it will be understood as this description proceeds that the specific form of the frame may be varied to suit any specified design. In the present instance, the window frame 24 comprises a front bar 46, a rear bar 47 and a top bar 48 connecting the upper ends of the end bars. The front bar 46 is inclined upwardly and rearwardly from the top of the angled extremity 40, which is extended upwardly (Figure 1) to overlie the lower end of the frame bar 46. The overlying portions of the extension 38 and frame bar 46 are riveted, welded or otherwise permanently secured together.

The rear end bar 47 of the frame 23 extends in a vertical direction (Figure 3) from the upper end of a top extremity 48 of extension 43 at the rear edge of the door and the lower end of the frame bar 47 overlies the extension extremity 48 at the rear edge of the removable inner panel 33. The extension 43 is riveted, welded or otherwise permanently secured to the lower end of the vertical frame bar 47. Thus, it will be seen that the window frame 24 forms a unitary assembly with the removable inner panel unit 22.

The opening defined by the frame 24 is adapted to be closed by a window assembly 49 which in the present instance is shown as a conventional ventilator window unit. The window assembly 49 comprises a vertically slidable window panel 50 and a pivoted ventilator panel 51 positioned in the plane of the panel 50 at the front edge of the latter as illustrated and described in greater detail in my copending application identified above. As shown in Figure 5 of the drawings, the rear edge of the window panel 50 is engageable with a vertically extending guide channel 52 which is secured to the inner face of the frame bar 47 and projects downwardly into a space or well provided between the outer panel 21 and the inner panel unit 22. The front edge of the window panel 50 is engageable in a vertically extending guide channel 53 which also forms a division bar between adjacent edges of the two window panels. The upper end of the division bar 53 is secured to the top frame bar 48 and the lower end projects into the well referred to above in order to cooperate with the channel 52 to slidably support the panel 50 throughout the extent of its vertical sliding movement. It will also be noted that the lower end of the division bar 53 is secured to the inner door panel section 25 by a bracket 54.

Referring again to Figure 3 of the drawings, it will be noted that the upper edge of the removable inner panel 33 flares outwardly and coacts with the top edge of the outer panel 21 to provide a slot or access opening 55 through which the panel 50 may slide into and out of the well. The vertical guides 52 and 53 extend into the well a sufficient distance to support the window panel 50 in its lowermost position and the vertical height of the removable inner panel 33 in the region of the path of travel of the panel 50 is determined to enable effectively supporting the lower ends of the guides on the outer surface of the removable panel.

The ventilator panel 51 has a glass-retaining channel 56 secured to the front edge thereof (Figure 1) and extending rearwardly along the bottom edge. In practice, the glass-retaining channel 56 is also extended rearwardly along the top edge of the panel 51 in a manner not shown herein. The portion of the glass-retaining channel 56 at the front edge of the panel 51 is engageable with a weatherstrip anchored on the inner surface of the vertical frame bar 46 and the portion of the glass-retaining channel extending along the top edge of the panel 51 is engaged by a similar weatherstrip which is secured to the top bar 48 of the frame 24. The portion of the glass-retaining channel 56 extending along the bottom edge of the panel 51 is engageable with a length of suitable weatherstripping (not shown) which is secured to the top of the removable inner panel unit 22. Garnish molding 58 is secured to the upper portion of the panel 33 section at the inner side of the latter and extends for the full width of the door. The lower edge of the garnish molding 58 overlies the top edge of the trim panel 34 and the top edge of the garnish molding 58 adjacent the ventilator panel 51 abuts the weatherstripping. Any suitable means, not shown herein, may be provided for clamping the garnish molding 58 to the removable panel 33.

In accordance with conventional practice, the ventilator panel 51 is supported for swinging movement about an up and down axis at pivot pins 60 respectively supported by the frame 24 and removable inner panel 33. In the present instance, the panel 51 is swung about the axis of pins 60 by irreversible gearing (not shown) supported on the removable panel and operated from the inner side of the door by a handle 61. The rear edge of the ventilator window panel 51 is engageable with a vertical abutment extending forwardly from the inner side of the guide channel 53. All of the above parts are carried by the removable inner panel 33 and, hence, may be installed as a unit with the latter.

The vertically slidable panel 50 is operated by regulator mechanism 62 positioned within the window well at the inner side of the path of travel of the panel 50. The regulating mechanism 62 may be of any accepted design and, hence, is not shown in detail herein. As indicated in Figure 1, however, the regulator mechanism selected for the purpose of illustration is of the cross arm type. The upper ends of the arms are respectively slidably connected to a bottom channel on the panel 50 at points spaced from each other lengthwise of the panel 50 and the lower end of one of the arms has a sliding connection with a mounting plate 63 which is welded or otherwise secured to the outer side of the removable inner panel 33. The lower end of the other arm is connected to a gear segment 64 rotatably supported on the plate 63 in the usual manner and operated by a handle 65 which is accessible from the inner side of the door. As is ordinarily the case, rotation of the handle 65 in opposite directions actuates the cross arms in the appropriate manner to raise and lower the vertically slidable window panel 50. It is apparent that the window regulating mechanism 62 is carried by the removable inner panel 33 and is capable of installation as a unit with the latter and window frame 24.

Referring to Figure 3 of the drawings, the reference numeral 66 indicates a latch assembly of the rotary bolt type. This latch assembly comprises a supporting plate 67 which is secured to the extension 43 of the removable inner panel 33 and may also be attached to the plate 63. In any case the latch mechanism 66 is carried by the removable inner panel unit 22 and in the present instance the remote control mechanism 68 for the latch assembly is also mounted on the removable inner panel unit 22. The remote control mechanism 68 comprises a handle 69, accessible for manipulation from the inner side of the door, and linkage 70 operatively connecting the handle to the bolt releasing mechanism of the latch assembly. This specific arrangement forms no part of the present invention and, hence, is not shown in detail herein.

The shallow flanging of inner panel 33 at 35 enables it to be made using conventional dies rather than by more involved cam die operations. Yet the assembly of inner panel 33 with the rail 23 and outer panel 21 is a simple one indeed. Thus the door structure 20 can be produced in any degree of complexity of its curves without recourse to deep drawing operations on panel unit 22, such as would be necessary if its flanging 35 were of full inside-to-outside width.

In accordance with the invention it is possible for a manufacturer to standardize production considerably by employing a basic inner panel unit 22, as well as a basic window frame 24, both adapted to be assembled in a single operation to outer panels 21 of differing sectional contour, as by the use of rail structures 23 of differing cross sectional outline. By the same token, window frames 24 of different sorts may be pre-assembled to a standard, basic inner panel, for final assembly as a unit to outer panels and rails of any desired configuration. In either instance the need for expensive deep drawing operations is avoided and tooling costs are greatly reduced.

It is evident that the invention presents important advantages in regard to stock control in a plant and in regard to the simplification of assembly line operations. These advantages, coupled with the factor of cheaper tooling, offset the somewhat greater prime cost of the improvement and suit the bench assembled inner panel consrtuction admirably to the procedures of a large percentage of automotive fabricators.

What I claim as my invention is:

1. A vehicle door having a lower body portion and provided above said body portion with an upper window portion, the lower body portion including spaced apart inner and outer panels and a rail extending transversely between said panels, said rail being rigidly secured to said outer panel, said inner panel being removably secured to said rail and including an outturned extension, and the upper window portion including a window frame having a portion thereof overlapping and secured to the outturned extension of said removable inner panel, whereby said inner panel and frame as a unit are movable relative to the rest of the door.

2. A vehicle door having a lower body portion and provided above said body portion with an upper window portion, the lower body portion including spaced apart inner and outer panels and a rail extending transversely between said panels, said rail being rigidly secured to said outer panel, said inner panel being removably secured to said rail and including an outturned extension having an upwardly projecting portion, and the upper window portion including a window frame having a portion thereof overlapping and secured to the upwardly projecting portion of said outturned extension whereby said inner panel and frame as a unit are movable relative to the rest of the door.

3. A vehicle door having a lower body portion and provided above said body portion with an upper window portion, the lower body portion including a removable inner panel provided with an outturned extension, a supporting plate for a latch assembly secured to said outturned extension, and the upper window portion including a window frame having a portion thereof overlapping and secured to said outturned extension, whereby said inner panel, supporting plate and frame as a unit are movable relative to the rest of the door.

4. A vehicle door having a lower body portion and provided above said body portion with an upper window portion, the lower body portion including spaced apart inner and outer panels and a rail extending transversely between said panels, said rail being rigidly secured to said outer panel and having a cut away portion at its upper end to receive a supporting plate for a latch assembly for the door, the inner panel being removably secured to said rail and including an outturned extension overlapping said cut away portion, and the upper window portion including a window frame having a portion thereof overlapping and secured to said outturned extension, whereby said inner panel and frame as a unit are movable relative to the rest of the door.

5. A vehicle door having a lower body portion and provided above said body portion with an upper window portion, the lower body portion including spaced apart inner and outer panels and a rail extending transversely between said panels, said rail being rigidly secured to said outer panel and having a cut away portion at its upper end, the inner panel being removably secured to said rail and including an outturned extension overlapping said cut away portion, the upper window portion including a window frame having a portion thereof overlapping and secured to said outturned extension, and a supporting plate for a latch assembly for the door located within the cut away portion aforesaid of said rail and secured to the outturned extension of said inner panel, whereby said inner panel, supporting plate and frame as a unit are movable relative to the rest of the door.

6. A vehicle door having a lower body portion and provided above said body portion with an upper window portion, said lower body portion including spaced apart inner and outer panels and a continuous rail extending transversely between said panels at the side and bottom margins thereof, the outer panel being rigidly secured to said rail, the inner panel being detachably connected to said rail and including an outturned extension, and the upper window portion including a window frame having a portion forming an extension of and secured to the outturned extension of said detachable inner panel, whereby said inner panel and frame as a unit are movable relative to the rest of the door.

7. A vehicle door having a lower body portion and provided above said body portion with an upper window portion, said lower body portion including spaced apart inner and outer panels and a rail extending transversely between said panels at the side and bottom margins thereof, the outer panel being rigidly secured to said rail, the inner panel being detachably connected to said rail and including outturned extensions overlapping portions of said rail, and the upper window portion including a window frame having portions overlapping and secured to said outturned extensions, whereby said inner panel and window frame as a unit are movable relative to the rest of the door.

8. A vehicle door having a lower body portion and provided above said body portion with an upper window portion, said lower body portion including an outer panel having an end rail rigidly secured thereto, and a removable inner panel having an extension overlapped on and detachably secured to said rail, and the upper window portion including a frame having a portion overlapped on and rigidly secured to said extension of said removable inner panel, whereby said inner panel and frame as a unit are movable relative to the rest of the door.

References Cited in the file of this patent

UNITED STATES PATENTS

| | | |
|---|---|---|
| 1,786,073 | Marshall | Dec. 2, 1930 |
| 2,210,612 | Widman | Aug. 6, 1940 |
| 2,650,857 | Watter | Sept. 1, 1953 |
| 2,733,096 | Waterhouse et al. | Jan. 31, 1956 |

FOREIGN PATENTS

| | | |
|---|---|---|
| 822,657 | Germany | Nov. 26, 1951 |